No. 620,302. Patented Feb. 28, 1899.
W. J. GREENE.
AUTOMATIC CUT-OUT FOR ELECTRICAL TRANSFORMERS.
(Application filed Oct. 11, 1897.)
(No Model.) 4 Sheets—Sheet 1.

Witnesses.
J. F. Groat.
S. W. Brainard,

Inventor
William J. Greene,
By J. M. St. John
Atty

No. 620,302. Patented Feb. 28, 1899.
W. J. GREENE.
AUTOMATIC CUT-OUT FOR ELECTRICAL TRANSFORMERS.
(Application filed Oct. 11, 1897.)
(No Model.) 4 Sheets—Sheet 4.

Witnesses:
J. F. Groat.
S. W. Brainard.

Inventor
William J. Greene,
By J. M. St. John,
Atty.

UNITED STATES PATENT OFFICE.

WILLIAM JOSEPH GREENE, OF CEDAR RAPIDS, IOWA.

AUTOMATIC CUT-OUT FOR ELECTRICAL TRANSFORMERS.

SPECIFICATION forming part of Letters Patent No. 620,302, dated February 28, 1899.

Application filed October 11, 1897. Serial No. 654,761. (No model.)

*To all whom it may concern:*

Be it known that I, WILLIAM JOSEPH GREENE, a citizen of the United States, residing at Cedar Rapids, in the county of Linn and State of Iowa, have invented certain new and useful Improvements in Automatic Cut-Outs for Electrical Transformers; and I do hereby declare the following to be a full, clear, and exact description of the invention, such as will enable others skilled in the art to which it appertains to make and use the same.

This invention relates to devices for automatically cutting in and out transformers employed in electrical distribution, particularly in connection with alternating currents; and the object of the invention is to provide a simple and efficient apparatus for this purpose adapted to perform its duty without undue sparking or heating and with little attention or liability to get out of order.

The invention consists in certain improvements and novel features in this class of apparatus, which will be hereinafter fully set forth and claimed, reference being had to the accompanying drawings, forming a part of this specification, in which—

Figure 1:
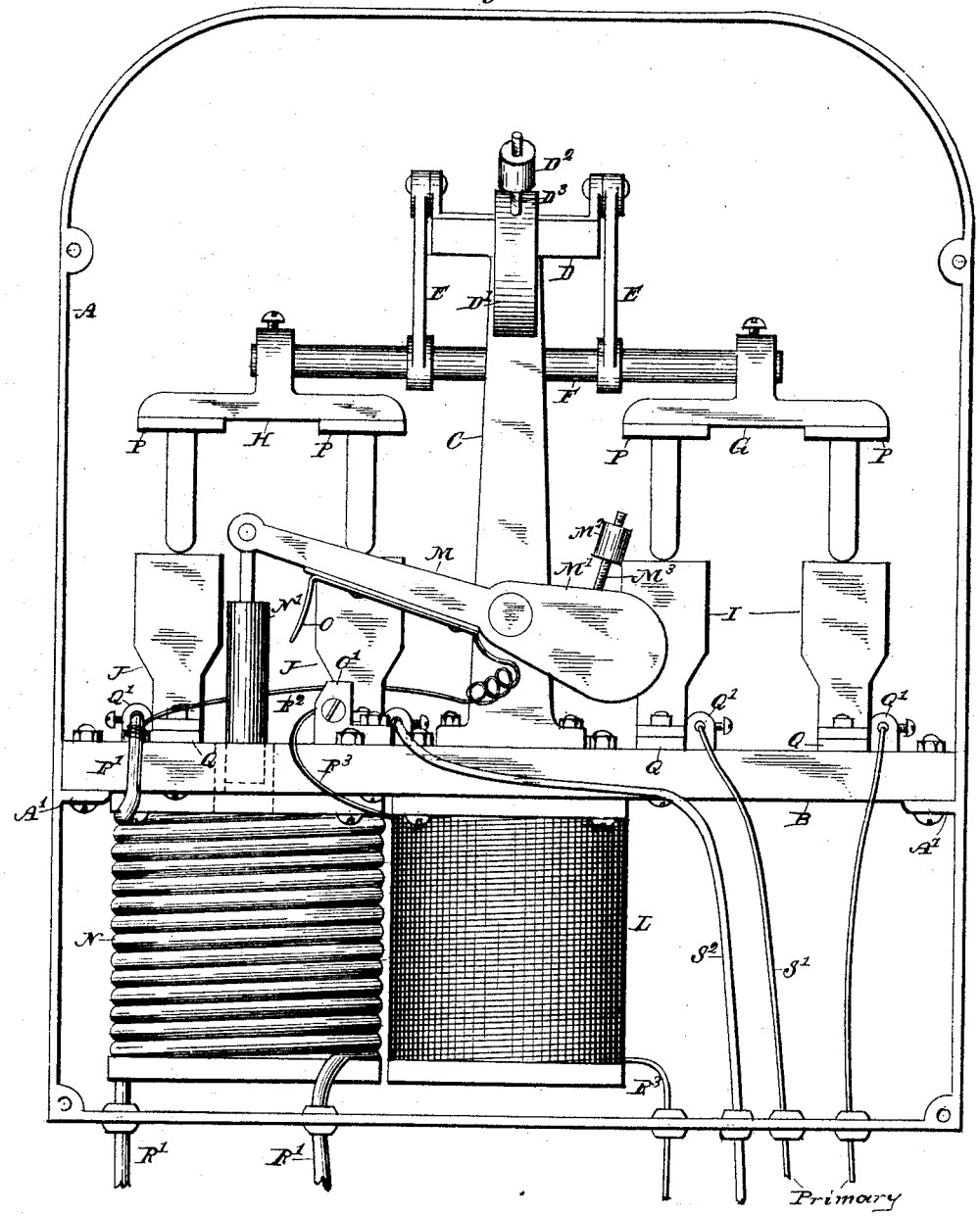
Figure 2:
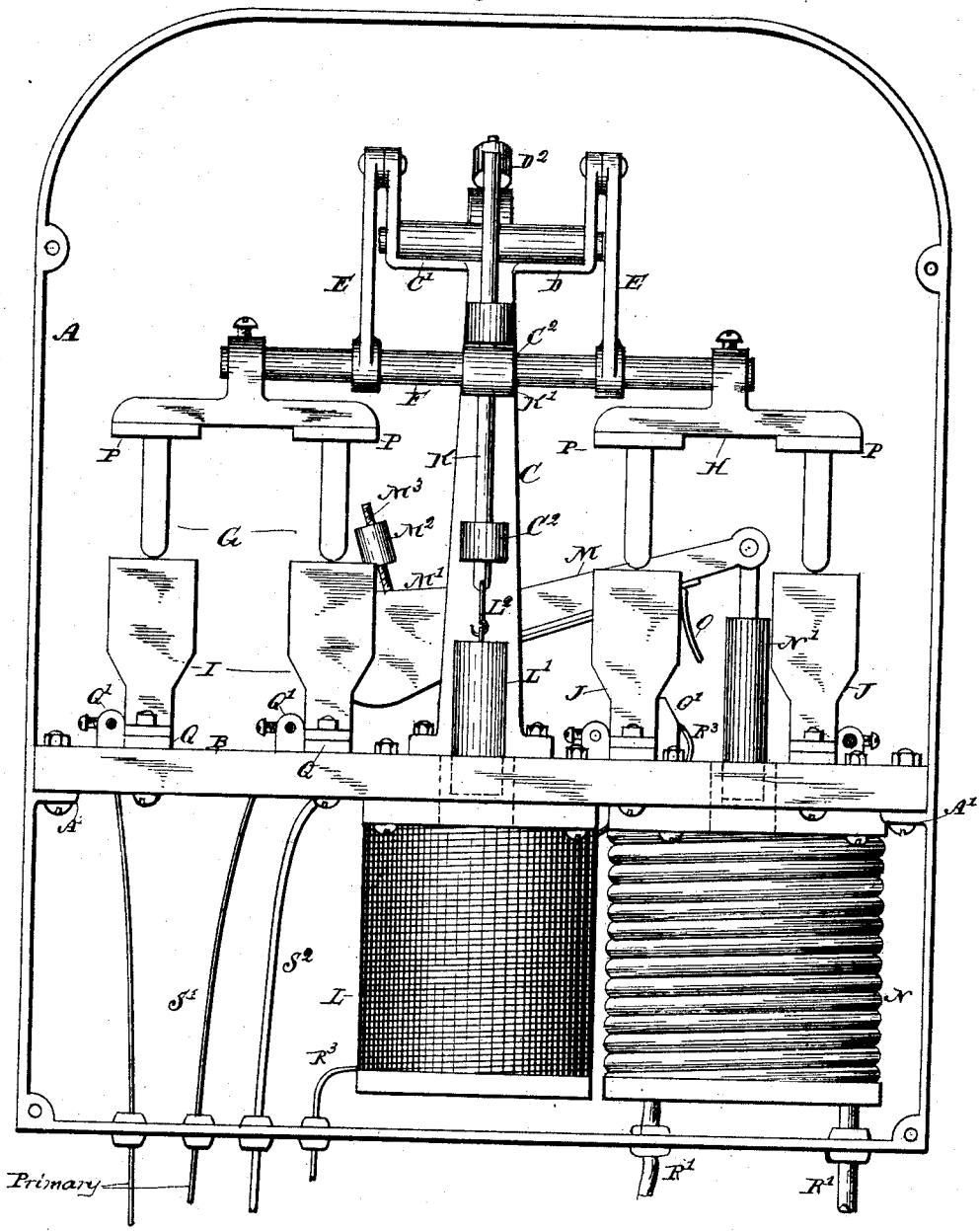
Figure 3:
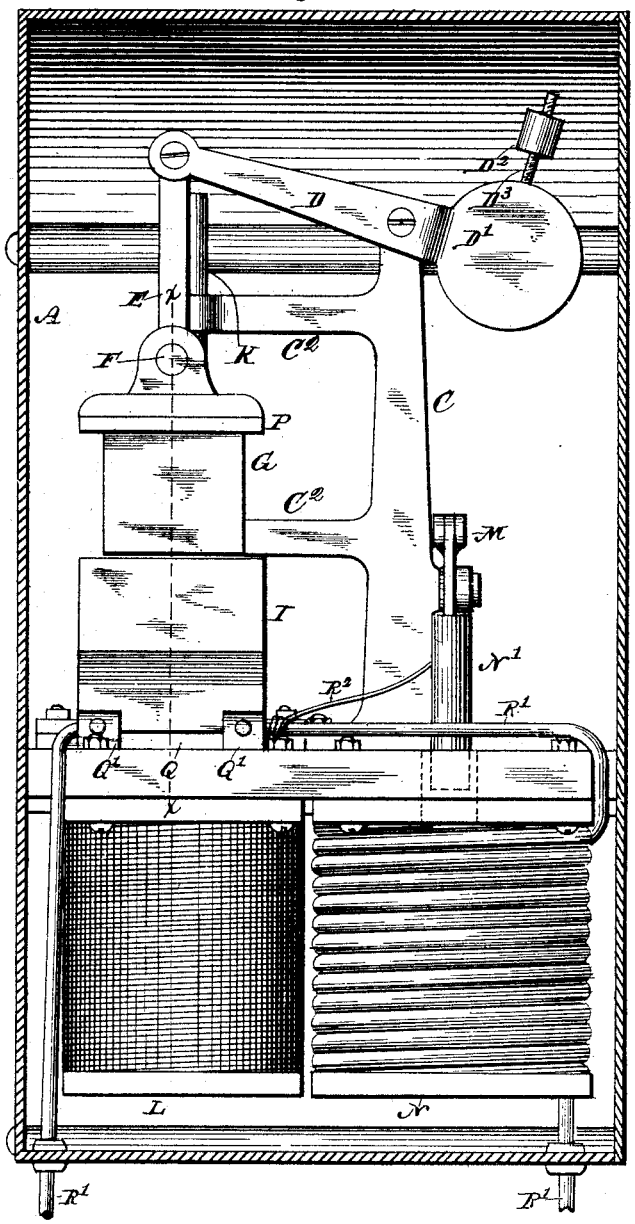
Figure 4:
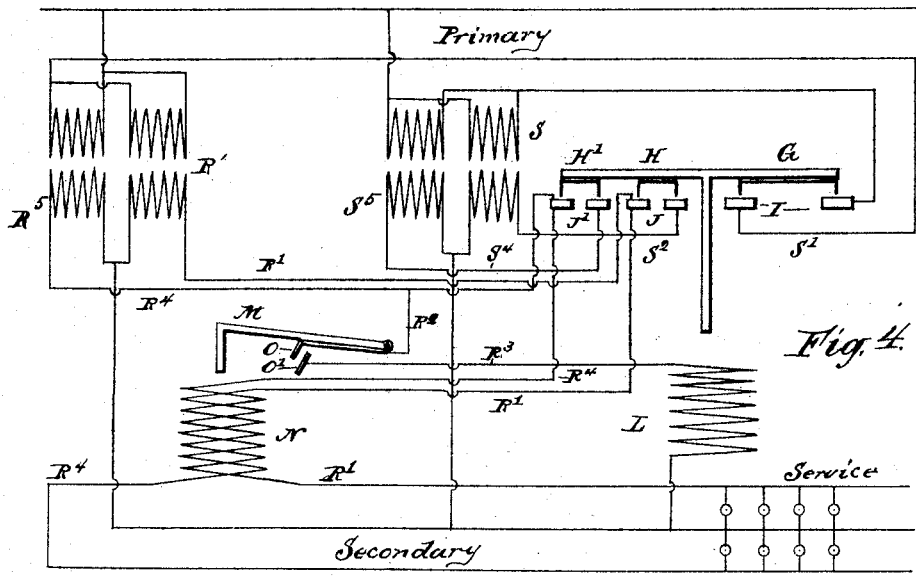
Figure 5:
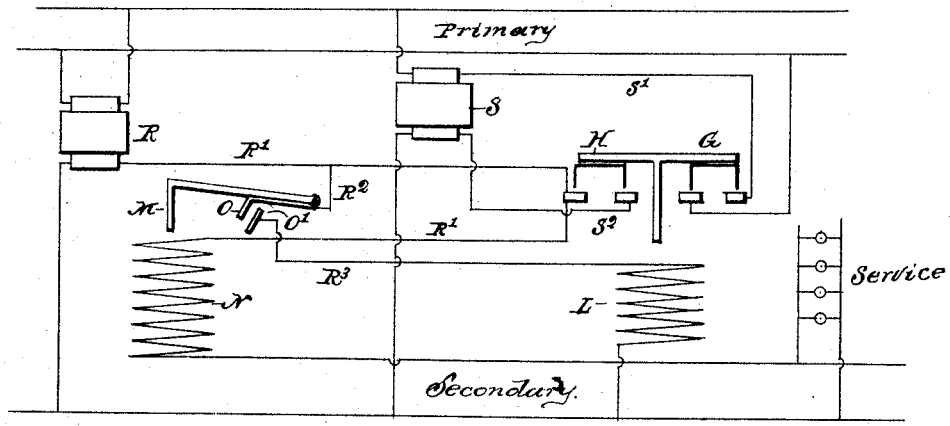
Figure 6:
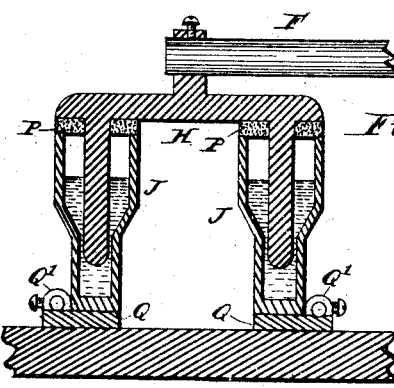

Figure 1, Sheet 1, is a front elevation of a device embodying my invention. Fig. 2, Sheet 2, is a rear elevation of the same. Fig. 3, Sheet 3, is a side elevation of the same as seen from the left-hand side of Fig. 1, the inclosing case being in central vertical section. Fig. 4, Sheet 4, is an ideal diagram illustrating the electrical connection of the apparatus with a three-wire system of distribution. Fig. 5 is a similar diagram illustrating the application of the apparatus to the ordinary two-wire system. Fig. 6 is a fragmentary section in the plane of the line $x\ x$, Fig. 3, showing detail of one of the main switches.

Similar letters of reference indicate corresponding parts.

The main purpose of the invention is to minimize the loss due to leakage in transformers when not required for service. Owing to the difficulty involved in cutting them in and out by hand it is now customary to keep transformers continuously charged, so as to be ready for any demand that may be made upon them during the regular service-hours of the day or night. This involves a considerable waste of energy during whatever period the circuit fed by any transformer may be idle. This invention contemplates the prevention of this loss, or all but a small fraction thereof, by providing means for automatically cutting out the transformer when its service-circuit is not required and cutting it in again automatically when current is needed.

The invention partakes of the nature of that embodied in Letters Patent No. 544,094, issued to me on the 6th day of August, 1895, but differs therefrom in several material features, as will be seen by reference to said patent and the description of this one which follows.

In a suitable case A, adapted to be fastened to a post or wall, is mounted, as by attachment to lugs A', an insulating-slab B. On this slab and under it are mounted the operative parts of the apparatus.

C is a standard with a T-head C' and a pair of lateral arms $C^2$. To the head is pivoted a bifurcated arm D, the separate arms of which connect by suitable links E with a rod or bar of insulation F, preferably of glass. This rod has mounted on it near its ends a pair of double-pole switch-contacts G and H, which move up and down to make contact with mercury or other suitable liquid conductor contained in cups I and J, attached to the slab B. These switch-contacts are made to move in a vertical plane by a guide-rod K, secured to the insulating cross-bar F by a suitable collar K' and sliding in bearings near the ends of the standard-arms $C^2$. The oscillating arm D thus serves only as a means for lifting the switch-contacts and their connections, and for this purpose it is provided with a suitable counterbalance-weight D'. In practice I make this weight but slightly, if at all, heavier than the weight depending from the opposite arms, but provide a small additional weight $D^2$, adjustable on a stem $D^3$, extending upwardly and at a considerable angle to the axis of the arm D. The purpose of this is to provide a little excess of weight at this end of the arm when the switch-contacts are down and the switches closed and a considerable excess when the switches are open. This will be clear by reference to Fig. 3, since it is obvious that the turning-moment of weight at the right of the pivots of the arm D on the standard is greater when the arm is in the position shown than it would be with the arm tilted to the opposite angle with the switches closed. Increasing power is thus imparted to the arm in the opening of the switches, thus preventing any tendency to lag or vibrate. So, also, in the closing of the switches the greatest power is required in the starting of the arm, and this is desirable to insure a quick and firm contact. On the under side of the slab, below the guide-rod K, is mounted a solenoid L of relatively high resistance. Its core L' connects with the guide-rod, as by a link $L^2$. It will of course be understood that the core passes through a suitable hole in the slab B, as indicated by the dotted lines. At the front of the standard is pivoted another oscillating arm M, with a counterbalance M' at one end and a supplemental weight $M^2$, adjustable on a stem $M^3$ in substantially the same manner as in the case of the other arm, already described. To the end of this arm opposite the weight is attached the core N' of a solenoid N with a coil of comparatively low resistance. This solenoid is also secured to the under side of the slab, which has a suitable hole for the core to pass through, as indicated by the dotted lines. This arm is provided with a contact-plate O, adapted to engage a terminal O' when the arm is down, and thus close a circuit in the operation of cutting in a converter.

In practice I prefer to make the mercury-cups in substantially the form illustrated, with a comparatively wide mouth to give plenty of space about the blade of the switch, but narrowed at the lower end to an internal diameter but little greater than the thickness of the blade, so that when the switch is completely closed the mercury surrounding the lower end of the blade offers but little resistance to the current. A further advantage incidental to this construction is the saving in the amount of mercury required for each cup by contracting the lower end.

To prevent undue evaporation of mercury, each switch-blade is provided with an elastic cap or gasket P, of suitable material, as cork, which when the switches are closed fits snugly on top of the cups, sealing them at the time when the heat engendered by the current would be likely to render the mercury a little volatile.

In practice the cups are mounted on terminal plates Q, provided with enlargements Q', which serve as binding-posts for the conducting-wires. This construction admits of the cups being taken off to refill or for any other purpose without disturbing the electrical connections.

The electrical connection of the apparatus in circuit is shown in Figs. 4 and 5. Referring to the simpler form shown in Fig. 5, the connection is as follows: R is a transformer in permanent electrical connection with the primary mains and may for convenience be designated as the "constant" transformer. S is the transformer to be cut in and out and may be called the "intermittent" transformer. One leg of the constant transformer connects directly with one of the secondary mains. The other leg R' is in series with the coil of the solenoid N. This leg also connects in multiple by a conductor $R^2$ with the contact-plate O on the oscillating arm M, and another conductor $R^3$ leads from the terminal O' through the coil of the solenoid L to the other secondary main. One leg of the primary coil in the intermittent transformer connects permanently and directly with one of the primary mains and one of its secondary legs in the same way with one of the secondary mains. The other primary leg S' leads through the switch G to the other primary main. The other secondary leg $S^2$ leads to one of the terminals of the switch H, the other corresponding terminal connecting with the leg R' of the other transformer.

The operation of the device will now be readily understood. Turning on a lamp in the service-circuit closes a circuit through the low-resistance coil of the solenoid N. Enough lamps being turned on so that the current is sufficient to cause the solenoid to draw down the arm N', a shunt-circuit is established through the high-resistance coil of the solenoid L. The greatly-augmented energy of this solenoid draws down the switch-terminals G and H forcibly, thus cutting in the intermittent transformer.

It will be seen that in this construction there is no attempt to break the electrical connection through the coil L at or before the closing of the main switches, as in my former patent above referred to. The amount of current used in this shunt-circuit is so small that in practice I prefer to use it continuously during such time as the intermittent transformer is cut in. By this means I am able to secure a positive closing of the switches without any tendency on their part to vibrate or spark and without undue heating.

The construction also has important advantages over a cut-out not provided with a "controller," as the initial circuit-closer M and its related parts may be called. It enables me to use a high-resistance coil where high magnetic energy is required to operate the main switch, but permits the current needed for lamp-service in any desired quantity to flow through a coil of low resistance without the heating incidental to the use of a single solenoid, since such a construction necessitates a comparatively high resistance to develop enough magnetic energy to operate the main switches successfully.

The device is adapted to operate several intermittent transformers as well as one by simply connecting them electrically, and as but one constant transformer is required for a considerable district a great saving is made in operating expense.

The device is also applicable to a three-wire system, as clearly illustrated in Fig. 4. In this case the connections of the primary coils of both the constant and the intermittent transformers are substantially the same as in the two-wire system, already described. For the secondary an additional switch H' J' is provided, with corresponding electrical connection R⁴ and S⁴ to connect it with the additional coils R⁵ and S⁵, respectively, of the constant and intermittent transformers. The solenoid N is also doubly wound, and both windings connect in series with the active outer wires of the secondary circuit and the constant transformer. The middle neutral wire of the secondary connects directly with the secondary coils of both transformers and also with the coil of the solenoid L. It will be apparent that the turning in of lamps either side of the neutral wire will serve to cut in the intermittent transformer in the manner already described.

Having thus described my invention, what I claim as new, and desire to secure by Letters Patent, is—

1. In an automatic cut-out for electrical transformers, the combination with a suitable retaining-case, of an oscillating controller pivoted to a suitable standard, a low-resistance solenoid adapted to move said controller to close a switch, a switch closed thereby and connections thereof with secondary mains and a transformer in permanent connection therewith, a high-resistance solenoid in a shunt-circuit through said controller, an intermittent transformer, and a switch coacting with the high-resistance solenoid to cut it in, said switch consisting essentially of cups containing mercury or the like conductor, double-pole contacts adapted to dip therein, a guide adapted to cause said contacts to move in a vertical plane, an oscillating, gravity-arm adapted to open the switch, a supporting-standard therefor and for the controller, and links connecting said gravity-arm with said mercury contact-switches, substantially as and for the purpose set forth.

2. In an automatic cut-out for electrical transformers, a switch for the primary and secondary circuits of an intermittent transformer consisting essentially of cups to hold a suitable liquid conductor, as mercury, double-pole contacts adapted to dip therein in a vertical plane, and gaskets of flexible material, as cork, attached to said contacts and adapted to close the cups when the switches are closed, to prevent evaporation, as described.

3. In an automatic cut-out for electrical transformers, the combination of terminal plates, to which the conducting-wires are attached, removable mercury-cups resting on said plates, and switch-terminals adapted to dip into said cups, and provided with sealing-gaskets of elastic material, as cork, substantially as and for the purpose set forth.

In testimony whereof I affix my signature in presence of two witnesses.

WILLIAM JOSEPH GREENE.

Witnesses:
J. M. ST. JOHN,
J. F. GROAT.